United States Patent
West

(10) Patent No.: US 9,037,111 B2
(45) Date of Patent: May 19, 2015

(54) LOCATION AWARE AUTHENTICATION TECHNIQUES

(75) Inventor: Graham West, Edinburgh (GB)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 13/561,681

(22) Filed: Jul. 30, 2012

(65) Prior Publication Data

US 2014/0031011 A1    Jan. 30, 2014

(51) Int. Cl.
| | |
|---|---|
| *H04M 1/66* | (2006.01) |
| *G06F 21/44* | (2013.01) |
| *G06F 21/40* | (2013.01) |
| *G06F 21/62* | (2013.01) |
| *H04W 4/02* | (2009.01) |
| *H04L 29/08* | (2006.01) |
| *H04L 29/06* | (2006.01) |
| *H04W 12/06* | (2009.01) |
| *H04W 12/08* | (2009.01) |

(52) U.S. Cl.
CPC ........ *G06F 21/44* (2013.01); *G06F 2221/2111* (2013.01); *G06F 2221/2129* (2013.01); *G06F 21/40* (2013.01); *G06F 21/6272* (2013.01); *G06F 2221/2117* (2013.01); *G06F 2221/2149* (2013.01); *H04W 4/02* (2013.01); *H04L 67/18* (2013.01); *H04L 63/107* (2013.01); *H04W 12/06* (2013.01); *H04W 12/08* (2013.01)

(58) Field of Classification Search
CPC ..... H04W 12/12; H04W 12/06; H04W 12/08; H04W 40/20; H04W 4/02; H04W 4/04
USPC ......... 455/411, 410, 414.2; 713/168; 380/278
See application file for complete search history.

(56) References Cited

U.S. PATENT DOCUMENTS

| | | | | |
|---|---|---|---|---|
| 2006/0282662 A1* | 12/2006 | Whitcomb | ................... | 713/156 |
| 2012/0144464 A1* | 6/2012 | Fakhrai et al. | ................... | 726/6 |
| 2012/0202459 A1* | 8/2012 | Martell et al. | ................ | 455/410 |
| 2013/0091452 A1* | 4/2013 | Sorden et al. | ................. | 715/771 |

\* cited by examiner

*Primary Examiner* — Kwasi Karikari
(74) *Attorney, Agent, or Firm* — Joseph P. Mehrle

(57) ABSTRACT

Location aware authentication techniques are provided. A user pre-registers a mobile device and a geographical location with a location-based authentication service. When the user attempts to access a target resource from the mobile device, a current location for the mobile device is resolved and communicated to the location-based authentication service. If the mobile device is within a geographical range of the pre-registered geographical location, then the mobile device is automatically authenticated for access to the target resource via the location-based authentication service.

19 Claims, 3 Drawing Sheets

LOCATION AWARE AUTHENTICATION TECHNIQUES

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like. In fact, even a consumer's mobile device can be used as a kiosk these days.

One issue with using a mobile device when transacting with a secure system is authentication. The input mechanism for achieving authentication on mobile devices, such as phones, is not particularly user friendly. Moreover, username & password based credential systems have limited security for many applications. As a result, some applications (e.g. banking) add additional challenge questions (e.g. "what is your mother's maiden name?"). The additional security requirements imposed by third-party services only adds to the user's frustration with achieving authentication via his/her mobile device.

Consequently, there is a particularly poor user experience that exists with mobile devices where typing is slow and users expect quick access. The input mechanism is cumbersome and clumsy and many users simply shy away from even attempting authentication via their mobile devices as a result.

SUMMARY

In various embodiments, location aware authentication techniques are presented. According to an embodiment, a method for providing a mobile device location aware authentication mechanism is provided.

Specifically,

DETAILED DESCRIPTION

Figure 1:
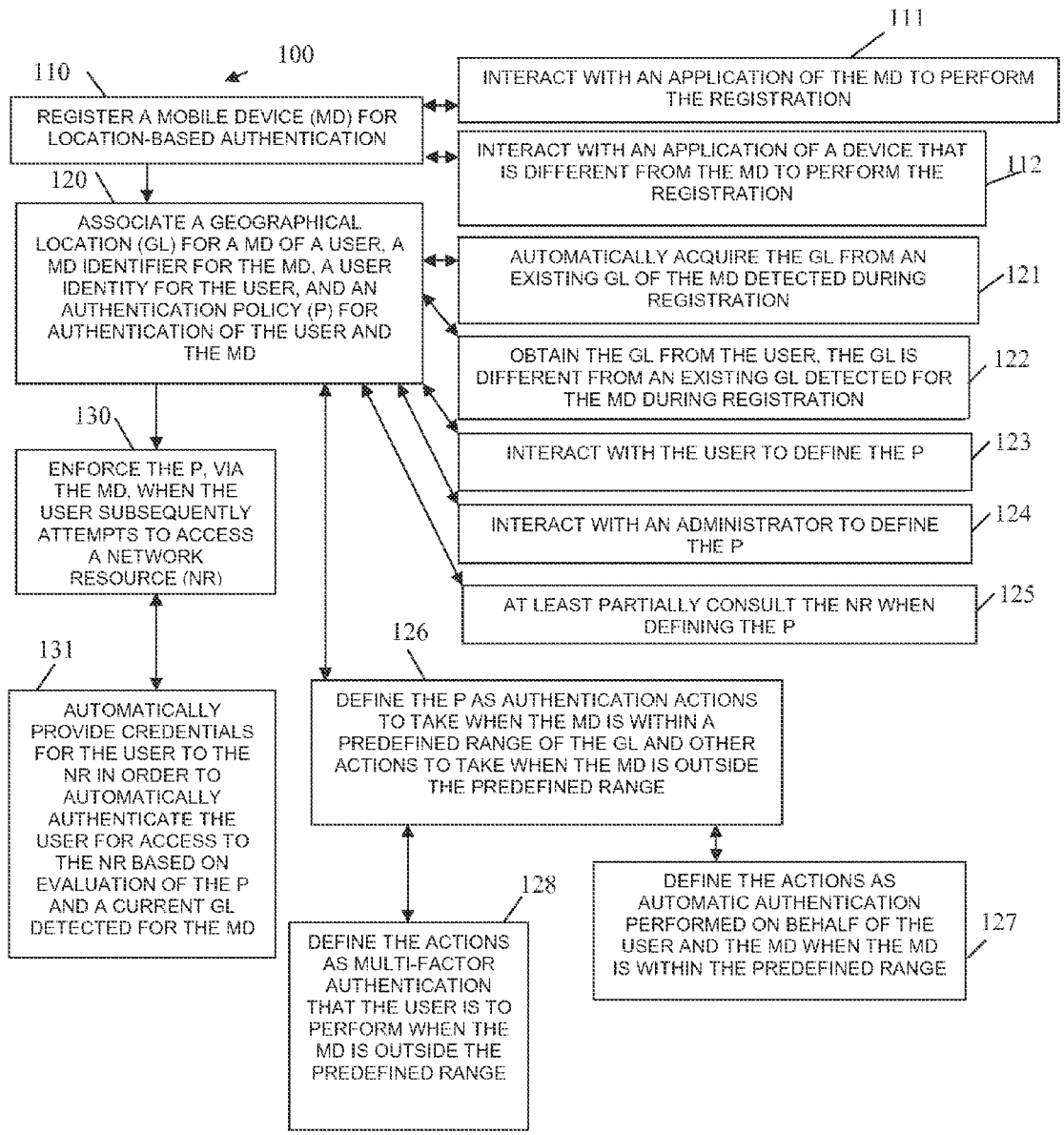
FIG. 1 is a diagram of a method for providing a mobile device location aware authentication mechanism, according to an example embodiment.

FIG. 1 is a diagram of a method 100 for providing a mobile device location aware authentication mechanism, according to an example embodiment. The method 100 (hereinafter "location-based authentication manager") is implemented as instructions programmed and residing on a non-transitory computer-readable (processor-readable) storage medium and executed by one or more processors, server, web-based Internet portal, cloud, virtual machine (VM), etc.) over a network connection. The processors are specifically configured and programmed to process the location-based authentication manager. The location-based authentication manager also operates over a network. The network is wired, wireless, or a combination of wired and wireless.

In an embodiment, the location-based authentication manager executes as a proxy on behalf of a secure resource, such as a bank or retail establishment, which is accessible over a network, such as the Internet. In one case, the proxy is a reverse proxy. In other instances, the location-based authentication manager is a user-based service that users can subscribe to and that interact with a secure network resource to perform authentication on behalf of the user. Moreover, the location-based authentication manager may execute in a cloud processing environment.

At 110, the location-based authentication manager registers a mobile device for location-based authentication services. This registration can occur in a variety of manners.

For example, at 111, the location-based authentication manager interacts with a user via an application that processes on the mobile device. So, the mobile device being registered with the location-based authentication manager is used to interact with the location-based authentication manager for registration.

In an alternative scenario, at 112, the location-based authentication manager interacts with an application of a device that is different from the mobile device that is being registered. Here, the user can use a laptop or tablet to interact with the location-based authentication manager and register another mobile device of the user's, such as a smart phone. The point is that the registration can occur on a device that is different from the mobile device being registered.

At 120, the location-based authentication manager (as part of the registration process) associates or links together: a geographical location for the mobile device, an identifier for the mobile device, an identity for the user, and an authentication policy for performing location-based authentication.

According to an embodiment, at 121, the location-based authentication manager automatically acquires the geographical location of the mobile device from an existing geographical location detected for the mobile device during registration. In other words, the registration is being performed via the mobile device and an interface option permits the geographical location to register to be automatically detected based on the current and existing geographical location of the mobile device.

In an embodiment, at 122, the location-based authentication manager obtains the geographical location to register from a user and the obtained geographical location is different from an existing detected geographical location for the mobile device. So, the mobile device may be used to perform the registration and may be in a different geographical location from that which the user wants to register.

In yet another scenario, at 123, the location-based authentication manager interacts with the user to define the authentication policy.

In an embodiment, at 124, the location-based authentication manager interacts with an administrator to define the authentication policy.

In another case, at 125, the location-based authentication manager at least partially consults the secure network resource to define the authentication policy.

According to an embodiment, at 126, the location-based authentication manager defines the authentication policy as actions to take when the mobile device is within a predefined range of the registered geographical location for the mobile device; and other actions are also defined in the authentication policy to take when the mobile device is outside the predefined range from the registered geographical location.

These actions can include a type of authentication or types of authentication to perform along with specific authentication information to use or request to complete the type or types of authentication being performed.

As used herein, "geofence" refers to a known or registered geographical location around or within proximity to geographical coordinates. So, the geographical location registered includes a range or geofence about its coordinates.

Continuing with the embodiment of 126 and at 127, the location-based authentication manager defines the actions as automatic authentication performed on behalf of the user and the mobile device with respect to the secure network resource when the mobile device is within the predefined range of the registered geographical location (within the geofence).

Still continuing with the embodiment of 126 and at 128, the location-based authentication manager defines the other actions as multi-factor authentication that the user is requested to perform with the mobile device is outside the predefined range of the registered geographical location (outside the geofence).

At 130, the location-based authentication manager enforces the registered authentication policy when the user subsequently attempts to access a secure network resource that requires authentication. This is done on behalf of the user and the mobile device and is based on the geographical location of the mobile device when the attempt is made by the user to access the secure network resource.

In an embodiment, at 131, the location-based authentication manager automatically provides registered credentials to the secure network resource on behalf of the user in order to automatically authenticate the user for access to the secure network resource based on dynamic evaluation of the authentication policy and a dynamically resolved current geographical location of the mobile device.

It is noted that some credentials may be requested of the user even when the mobile device is within the geofence. Whether credentials are automatically supplied or partially requested is driven by the tenets of the authentication policy, which can be customized on a per user, per device, and/or per secure network resource basis.

Figure 2:
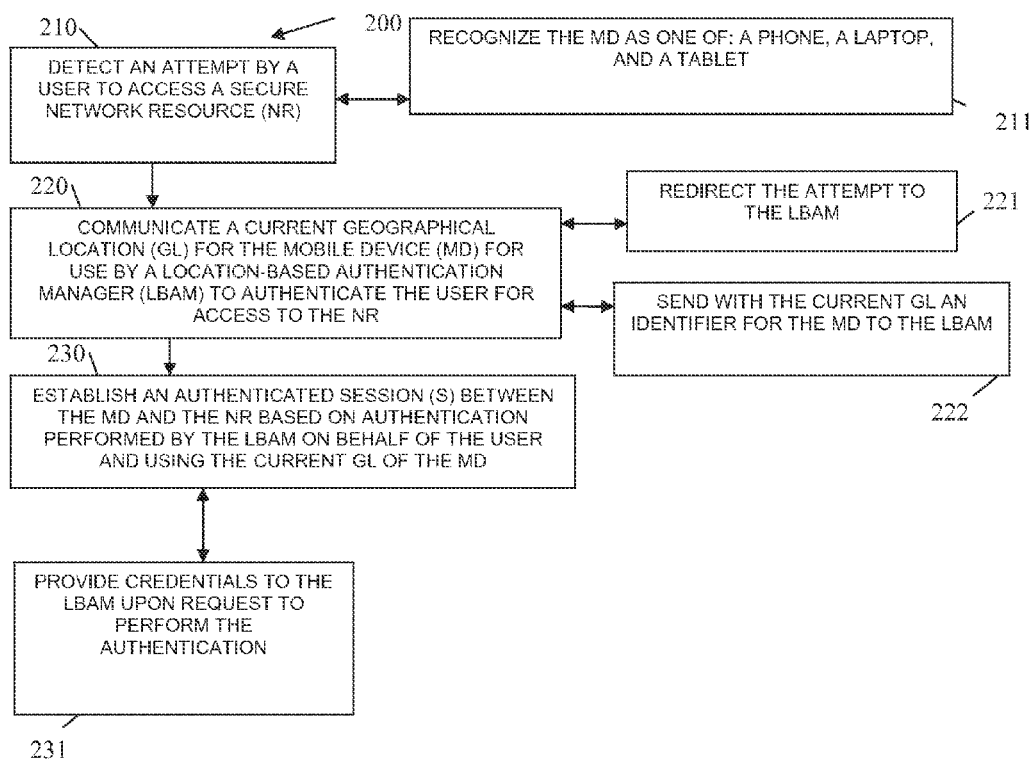
FIG. 2 is a diagram of another method for providing a mobile device location aware authentication mechanism, according to an example embodiment.

FIG. 2 is a diagram of another method 200 for providing a mobile device location aware authentication mechanism, according to an example embodiment. The method 200 (hereinafter "location authenticator") is implemented as instruction and programmed within a non-transitory computer-readable (processor-readable) storage medium that executes on one or more processors of a network-based machine or standalone machine; the processors of the machine are specifically configured to execute the location authenticator. The location authenticator is also operational over a network; the network is wired, wireless, or a combination of wired and wireless.

The processing of the location authenticator reflects enhanced and different aspects of the location-based authentication manager represented by the method 100 of the FIG. 1. That is, the location-based authentication manager reflects processing of the location-based authentication service that processes remote from a user's mobile device at a network site, such as a cloud processing environment. The location authenticator processes as an application on the mobile device of the user and interacts with the location-based authentication manager to effectuate location-based authentication.

At 210, the location authenticator detects an attempt by the user to access a secure network resource. A "secure network resource" is any third-party web-based or network-based service requiring authentication for access.

According to an embodiment, at 211, the location authenticator recognizes the mobile device as a phone, a tablet, and/or a laptop device of the user.

At 220, the location authenticator communicates a current geographical location for the mobile device to a location-based authentication manager, such as the location-based authentication manager represented by the method 100 of the FIG. 1. The location-based authentication manager uses the current geographical location of the mobile device to perform authentication on the user and the mobile device based on a previous registration having a registered authentication policy (as described above with reference to the FIG. 1).

In an embodiment, at 221, the location authenticator redirects the user's attempt to access the secure network resource on the mobile device to the location-based authentication manager. So, here the location authenticator acts as a local and transparent proxy on the mobile device of the user.

In some cases, at 222, the location authenticator also sends a mobile device identifier to the location-based authentication manager for the location-based authentication manager to look-up and locates a previous registration associated with that mobile device.

At 230, the location authenticator establishes an authenticated session between the secure network resource and the user, via the mobile device, which is based on authentication that was performed by the location-based authentication manager on behalf of the user and using the current geographical location of the mobile device.

According to an embodiment, at 231, the location authenticator provides credentials to the location-based authentication manager to perform the authentication. This can be securely stored and retrieved on demand from the mobile device by the location authenticator or can be interactively requested of the user by the location authenticator.

Figure 3:
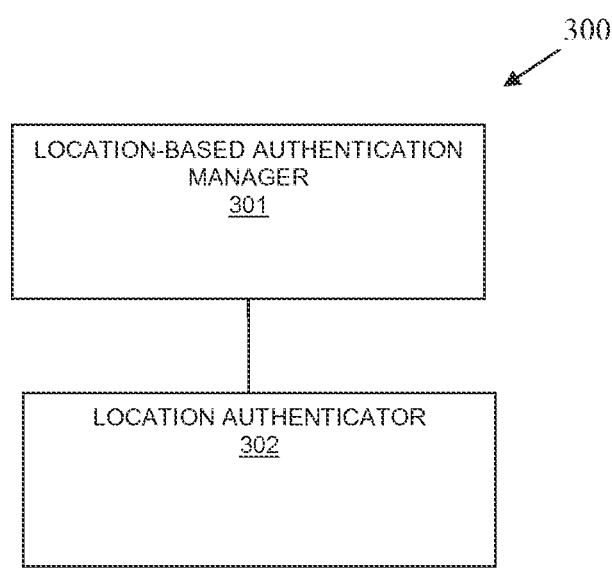
FIG. 3 is a diagram of a mobile device location aware authentication system, according to an example embodiment.

FIG. 3 is a diagram of a mobile device location aware authentication system 300, according to an example embodiment. The components of the mobile device location aware authentication system 300 are implemented as executable instructions and programmed within a non-transitory computer-readable (processor-readable) storage medium that execute on one or more processors of a network-based server (cloud, proxy, Virtual Machine (VM), etc.) or a standalone machine (client device (laptop, tablet, computer), cashier-manned checkout station, self-service checkout station, kiosk, etc.); the processors are specifically configured to execute the components of the mobile device location aware authentication system 300. The mobile device location aware authentication system 300 is also operational over a network; the network is wired, wireless, or a combination of wired and wireless.

The mobile device location aware authentication system 300 includes a location-based authentication manager 301 and a location authenticator 302. Each of these components and the interactions of each component are now discussed in turn.

The mobile device location aware authentication system 300 includes one or more processors configured with the location-based authentication manager 301, which resides and is implemented in memory or non-transitory computer-readable storage media; the location-based authentication manager 301 executes on the one or more processors. Example processing associated with the location-based authentication manager 301 was presented in detail above with reference to the method 100 of the FIG. 1.

The location-based authentication manager 301 is configured to interact with the location authenticator 302 to decide on a level of authentication to perform against a user of the mobile device based on a current geographical location for the mobile device when the user attempts to access a network resource.

According to an embodiment, the location-based authentication manager 301 is further configured to pre-register the mobile device and the user along with one or more pre-defined geographical locations (geofences) for the mobile device.

The mobile device location aware authentication system 300 also includes the mobile device, which is configured with the location authenticator 302, which resides and is implemented in memory or non-transitory computer-readable storage media of the mobile device; location authenticator 302 executes on the one or more processors of the mobile device. Example processing associated with the location authenticator 302 was presented in detail above with reference to the method 200 of the FIG. 2.

In an embodiment, the mobile device is one of: a phone, a laptop, and a tablet.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a machine configured to execute the method, comprising:
   registering, at the machine, a mobile device for location-based authentication;
   linking, at the machine, a geographical location for the mobile device of a user, a mobile device identifier for the mobile device, a user identity for the user, and an authentication policy for authentication of the user and the mobile device, the geographic location linked as a geofence that includes range of geographical coordinates around the geographical location, the geofence includes a registered geographical location that is within the range or a proximity to the geographical coordinates; and
   enforcing, at the machine, the authentication policy when the user, via the mobile device, subsequently attempts to access a network resource and retrieving on demand credentials securely stored on the mobile device when enforcing the authentication policy, the securely stored credentials stored on the mobile device including at least the mobile device identifier for the mobile device and the user identity for the user.

2. The method of claim 1, wherein registering further includes interacting with an application of the mobile device to perform the registration.

3. The method of claim 1, wherein registering further includes interacting with an application of a device that is different from the mobile device to perform the registration.

4. The method of claim 1, wherein associating further includes automatically acquiring the geographical location from an existing geographical location of the mobile device detected during registration.

5. The method of claim 1, wherein associating further includes obtaining the geographical location from the user, wherein the geographical location is different from an existing geographical location detected for the mobile device during registration.

6. The method of claim 1, wherein associating further includes interacting with the user to define the authentication policy.

7. The method of claim 1, wherein associating further includes interacting with an administrator to define the authentication policy.

8. The method of claim 1, wherein associating further includes at least partially consulting the network resource when defining the authentication policy.

9. The method of claim 8, wherein associating further includes at least partially defining the authentication policy as authentication actions to take when the mobile device is within a predefined range of the geographical location and other actions to take when the mobile device is outside the predefined range.

10. The method of claim 9, wherein at least partially defining further includes defining the actions as automatic authentication performed on behalf of the user and the mobile device when the mobile device is within the predefined range.

11. The method of claim 9, wherein at least partially defining further includes defining the other actions as multi-factor authentication that the user is to perform when the mobile device is outside the predefined range.

12. A processor-implemented method programmed in a non-transitory processor-readable medium and to execute on one or more processors of a machine configured to execute the method, comprising:
   detecting, at the machine, an attempt by a user of a mobile device to access a secure network resource;
   communicating, from the machine, a current geographical location for the mobile device for use by a location-based authentication manager to authenticate the user for access to the secure network resource, the geographical location communicated as a geofence including a range of geographic coordinates around the geographical location, the geofence includes a registered geographical location that is within the range or a proximity to the geographical coordinates; and
   establishing, at the machine, an authenticated session between the mobile device and the secure network resource based on authentication performed by the location-based authentication manager on behalf of the user and using the current geographical location of the mobile device by, at least in part, retrieving on demand credentials securely stored on the mobile device when performing the authentication, the securely stored credentials stored on the mobile device including at least the mobile device identifier for the mobile device and the user identity for the user.

13. The method of claim 12, wherein detecting further includes recognizing the mobile device as one of: a phone, a laptop, and a tablet.

14. The method of claim 12, wherein communicating further includes redirecting the attempt to the location-based authentication manager.

15. The method of claim 12, wherein communicating further includes sending with the current geographical location an identifier for the mobile device to the location-based authentication manager.

16. The method of claim 12, wherein establishing further includes providing additional credentials to the location-based authentication manager upon request to perform the authentication.

17. A system comprising:
- a processor configured with a location-based authentication manager implemented within a non-transitory computer-readable storage medium and that executes on the processor; and
- a mobile device configured with a location authenticator implemented within a non-transitory computer-readable storage medium that executes on the mobile device;
- wherein the location-based authentication manager is configured to interact with the location authenticator to decide on a level of authentication to perform against a user of the mobile device based on: (i) a current geographical location for the mobile device when the user attempts to access a network resource and (ii) retrieval on demand credentials securely stored on the mobile device, the securely stored credentials stored on the mobile device including at least a mobile device identifier for the mobile device and a user identity for the user, the current geographical location represented as a geofence that includes a range of geographic coordinates around a specific geographic location, the geofence includes a registered geographical location that is within the range or a proximity to the geographical coordinates.

18. The system of claim 17, wherein the mobile device is one of: a phone, a tablet, and a laptop.

19. The system of claim 17, wherein the location-based authentication manager is further configured to pre-register the mobile device and the user along with one or more pre-defined geographical locations for the mobile device.

* * * * *